(12) United States Patent
Jang et al.

(10) Patent No.: US 12,356,505 B2
(45) Date of Patent: Jul. 8, 2025

(54) METHOD AND DEVICE FOR PERFORMING SENSING IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 17/928,912

(22) PCT Filed: Jun. 7, 2021

(86) PCT No.: PCT/KR2021/007090
§ 371 (c)(1),
(2) Date: Nov. 30, 2022

(87) PCT Pub. No.: WO2021/246842
PCT Pub. Date: Dec. 9, 2021

(65) Prior Publication Data
US 2023/0224695 A1 Jul. 13, 2023

Related U.S. Application Data

(60) Provisional application No. 63/104,462, filed on Oct. 22, 2020, provisional application No. 63/087,311, (Continued)

(51) Int. Cl.
*H04W 8/22* (2009.01)
*H04W 8/24* (2009.01)
*H04W 84/12* (2009.01)

(52) U.S. Cl.
CPC ............... *H04W 8/22* (2013.01); *H04W 8/24* (2013.01); *H04W 84/12* (2013.01)

(58) Field of Classification Search
CPC ......... H04W 8/22; H04W 8/24; H04W 84/12; H04W 8/005; G01S 7/006; G01S 13/003
See application file for complete search history.

(56) References Cited

U.S. PATENT DOCUMENTS

| | | | |
|---|---|---|---|
| 2010/0046455 A1* | 2/2010 | Wentink ................ | H04W 36/06 370/329 |
| 2024/0414689 A1* | 12/2024 | Dong ...................... | H04W 8/24 |

FOREIGN PATENT DOCUMENTS

| KR | 10-2015-0118887 A | 10/2015 |
|---|---|---|
| KR | 10-2020-0034647 A | 3/2020 |

OTHER PUBLICATIONS

P802.11-REVmd/D3.0, Oct. 2019 [retrieved on Mar. 8, 2025], Part 11: Wireless LAN Medium Access Control (MAC) and Physical Layer (PHY) Specifications, retrieved from the Internet: <URL: https://ieeexplore.ieee.org/document/8906267> (Year: 2019).*

(Continued)

*Primary Examiner* — Charles C Jiang
*Assistant Examiner* — Rachel Elizabeth Marks
(74) *Attorney, Agent, or Firm* — BRYAN CAVE LEIGHTON PAISNER LLP

(57) ABSTRACT

In a wireless local area network (LAN) system, a transmission STA may generate capability information related to WLAN sensing. The capability information may comprise a common part and an individual part. The common part may comprise sensing support band information including information related to whether WLAN sensing performed in a sub 7 GHz band is supported, and information related to whether WLAN sensing performed in a 60 GHz band is supported. The individual part may comprise, on the basis of the sensing support band information, at least one of capa- (Continued)

bility information for WLAN sensing performed in the sub 7 GHz band, and capability information for WLAN sensing performed in the 60 GHz band. The transmission STA may transmit the capability information to a reception STA.

15 Claims, 24 Drawing Sheets

Related U.S. Application Data filed on Oct. 5, 2020, provisional application No. 63/080,035, filed on Sep. 18, 2020, provisional application No. 63/034,991, filed on Jun. 5, 2020.

(56) References Cited

OTHER PUBLICATIONS

Chen, Wi-Fi Sensing Based on IEEE 802.11bf, Jan. 2023 [retrieved Mar. 6, 2025], IEEE Communications Magazine [online], retrieved from the Internet <URL: https://par.nsf.gov/servlets/purl/10485775> (Year: 2023).*

Liwen Chu et al., NXP, "Beacon, Capability, Operating Parameters", IEEE 802.11-19/0395r1, Jun. 4, 2020, see slides 2-10.

Claudio Da Silva, "WLAN Sensing Functional Requirements", IEEE 802.11-20/0780r1, May 20, 2020, see p. 2.

Abhishek Patil et al., Qualcomm Inc., "Container for advertising ML Information", IEEE 802.11-20/0357r0, Apr. 9, 2020, see slides 2-13.

* cited by examiner (a)

Simple　　WLAN Sensing
　　　　　 Enabled

FIG. 13

| | | WLAN Sensing Sub-Capability #1 | WLAN Sensing Sub-Capability #2 | ... | WLAN Sensing Sub-Capability #N |
|---|---|---|---|---|---|
| Example | #1 | Supported band | | | |
| | #2 | Channel Measurement | | | |
| | #3 | Maximum Sensing-capable bandwidth | | | |
| | #4 | Roles | | | |
| | ... | | | | |

| 2.4GHz | 5GHz | 6GHz | 60GHz |
|---|---|---|---|

| CSI* -based | ... |
|---|---|

*CSI: channel state information

| 20GHz | 40GHz | 80GHz | 160GHz | 320GHz |
|---|---|---|---|---|

| Sensing initiator | Sensing responder | Sensing transmitter | Sensing receiver |
|---|---|---|---|

FIG. 15

| WLAN Sensing Sub-Capability #1 | WLAN Sensing Sub-Capability #2 | ... | WLAN Sensing Sub-Capability #N |
|---|---|---|---|

| Example | #1 | PHY/MAC Capabiolities for WLAN sensing in Sub-7GHz |
|---|---|---|
| | #2 | PHY/MAC Capabiolities for WLAN sensing in 60GHz |
| | ... | ... |

FIG. 21

| Common Part | | Individual Part |
|---|---|---|
| Common PHY/MAC capabilities for WLAN sensing | ... | PHY/MAC Capabilities for WLAN sensing in Sub-7GHz only | PHY/MAC Capabilities for WLAN sensing in 60GHz only |

# METHOD AND DEVICE FOR PERFORMING SENSING IN WIRELESS LAN SYSTEM

CROSS REFERENCE TO RELATED APPLICATIONS

This application is the National Stage filing under 35 U.S.C. 371 of International Application No. PCT/KR2021/007090, filed on Jun. 7, 2021, which claims the benefit of and priority to U.S. Provisional Application No. 63/034,991, filed on Jun. 5, 2020, U.S. Provisional Application No. 63/080,035, filed on Sep. 18, 2020, U.S. Provisional Application No. 63/087,311, filed on Oct. 5, 2020 and U.S. Provisional Application No. 63/104,462, filed on Oct. 22, 2020, which are all hereby incorporated by reference herein in their entirety.

TECHNICAL FIELD

The present specification relates to a sensing technique in a WLAN system, and more particularly, relates to a procedure and a signaling method for performing sensing.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

SUMMARY

In a wireless local area network (WLAN) system according to various embodiments, a transmitting STA may generate capability information related to WLAN sensing. The capability information may include a common part and an individual part. The common part may include sensing support band information including information related to whether or not the WLAN sensing performed in the sub 7 GHz band is supported and information related to whether or not the WLAN sensing performed in the 60 GHz band is supported. The individual part may include at least one of capability information for WLAN sensing performed in the sub 7 GHz band and capability information for WLAN sensing performed in the 60 GHz band based on the sensing support band information. The transmitting STA may transmit the capability information to the receiving STA.

Because sub-7 GHz sensing and 60 GHz sensing are different, subsequent sensing operations and signaling may vary depending on whether the STA supports sub-7 GHz sensing or 60 GHz sensing. Therefore, it is necessary to know the corresponding capability. According to an example of the present specification, sensing capabilities between STAs may be recognized in the setup step, and association may be performed.

BRIEF DESCRIPTION OF THE DRAWINGS

FIG. 12 is a diagram illustrating an embodiment of a simple indication method.

FIGS. 13 to 22 are diagrams illustrating an embodiment of sensing capability.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

Figure 1:
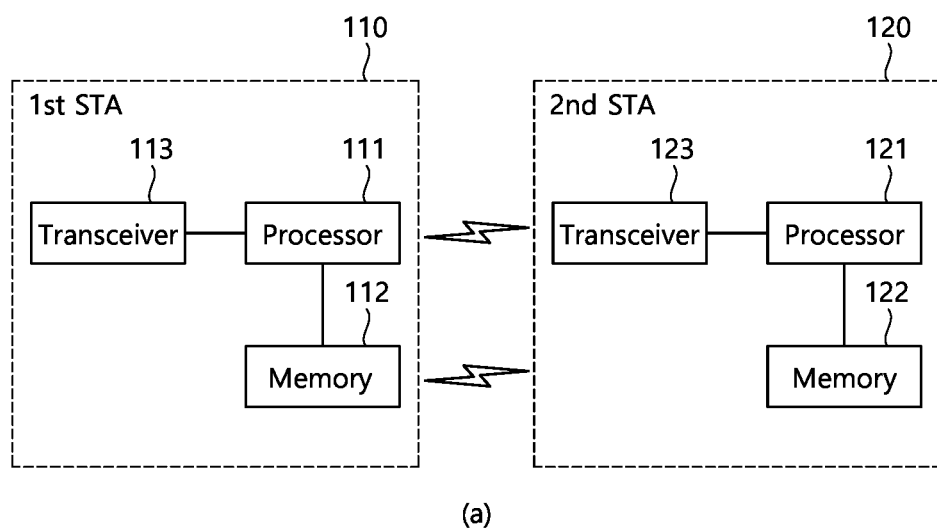
FIG. 1 illustrates an example of a transmitting apparatus and/or receiving apparatus of the present specification.
Figure 1:
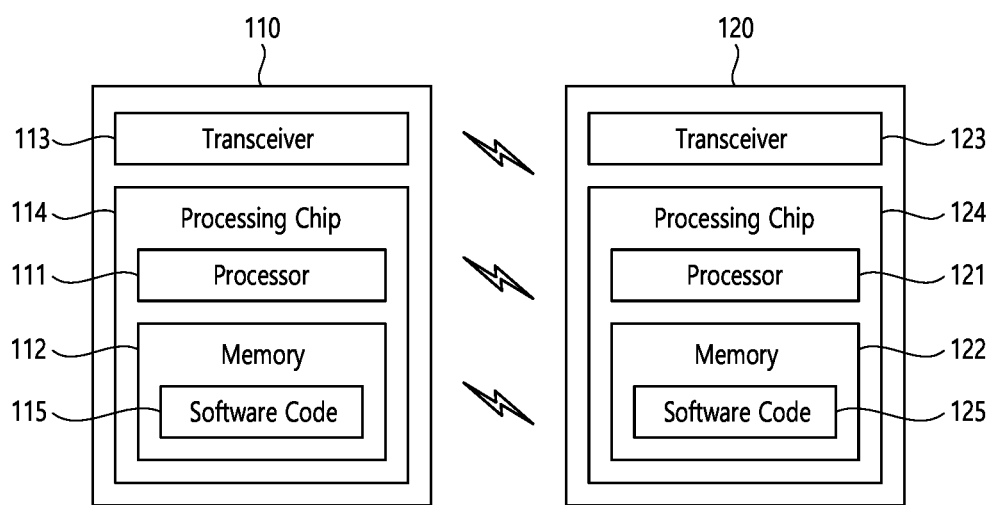

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/ receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/ parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/ receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may mean a link for communication from a non-AP STA to an AP STA, and an uplink PPDU/packet/signal or the like may be transmitted through the uplink. In addition, in the present specification, a downlink may mean a link for communication from the AP STA to the non-AP STA, and a downlink PPDU/packet/ signal or the like may be transmitted through the downlink.

A WLAN sensing technology is a sort of radar technologies which can be implemented without a standard, but it is conceived that more powerful performance can be obtained through standardization. The IEEE 802.11bf standard defines an apparatus participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus initiating sensing |
| Sensing Responder | apparatus participating in sensing |
| Sensing Transmitter | apparatus transmitting sensing PPDU |
| Sensing Receiver | apparatus receiving sensing PPDU |

Figure 2:
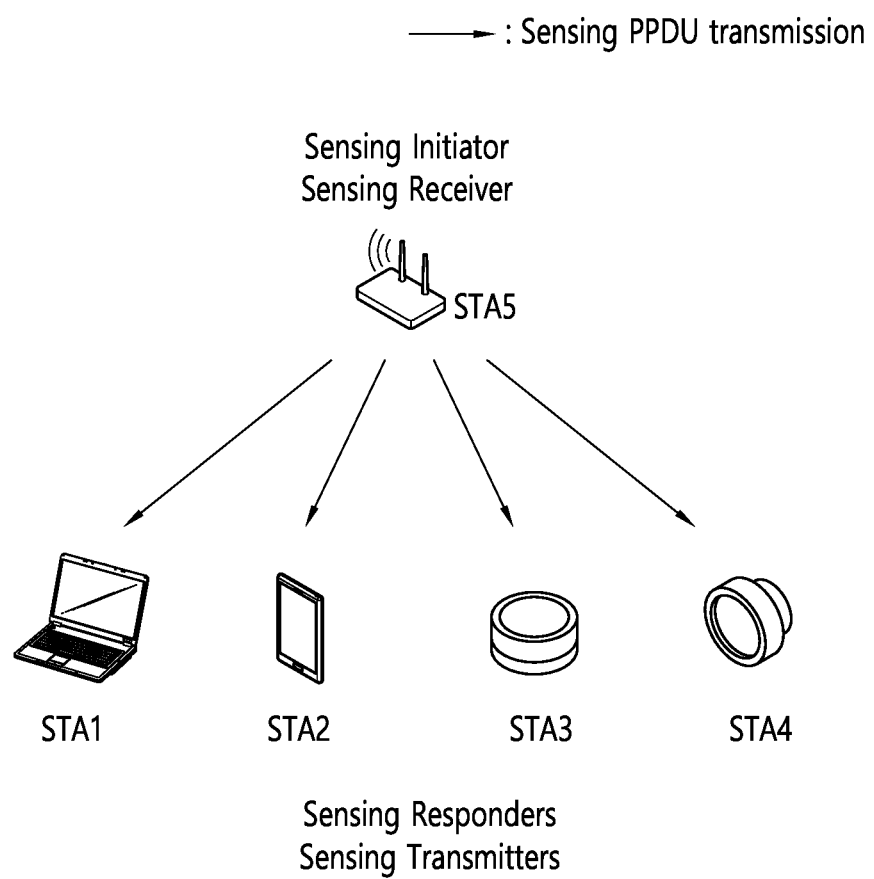
FIG. 2 illustrates an example of a WLAN sensing scenario using multiple sensing transmitting apparatuses.
Figure 3:
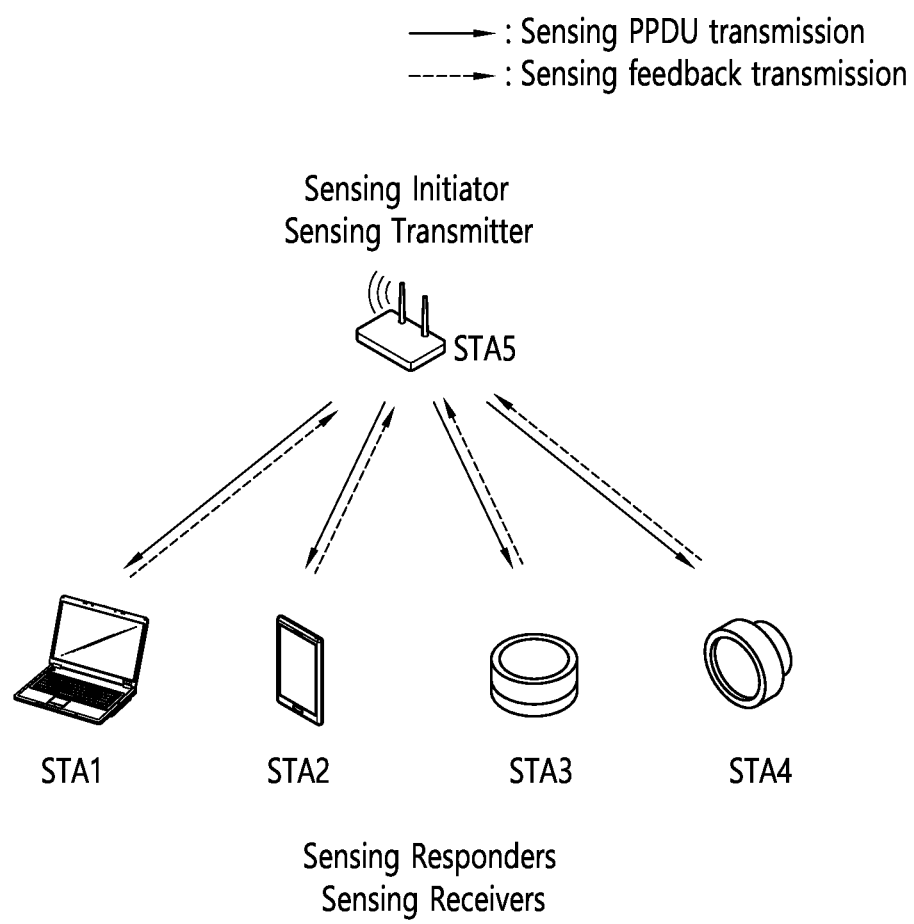
FIG. 3 illustrates an example of a WLAN sensing scenario using multiple sensing receiving apparatuses.

FIG. 2 illustrates an example of a WLAN sensing scenario using multiple sensing transmitting apparatuses. FIG. 3 illustrates an example of a WLAN sensing scenario using multiple sensing receiving apparatuses.

FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in case of FIG. 3, a procedure for transmitting (feeding back) a sensing measurement result to the sensing initiation apparatus (STA 5) is additionally required.

Figure 4:
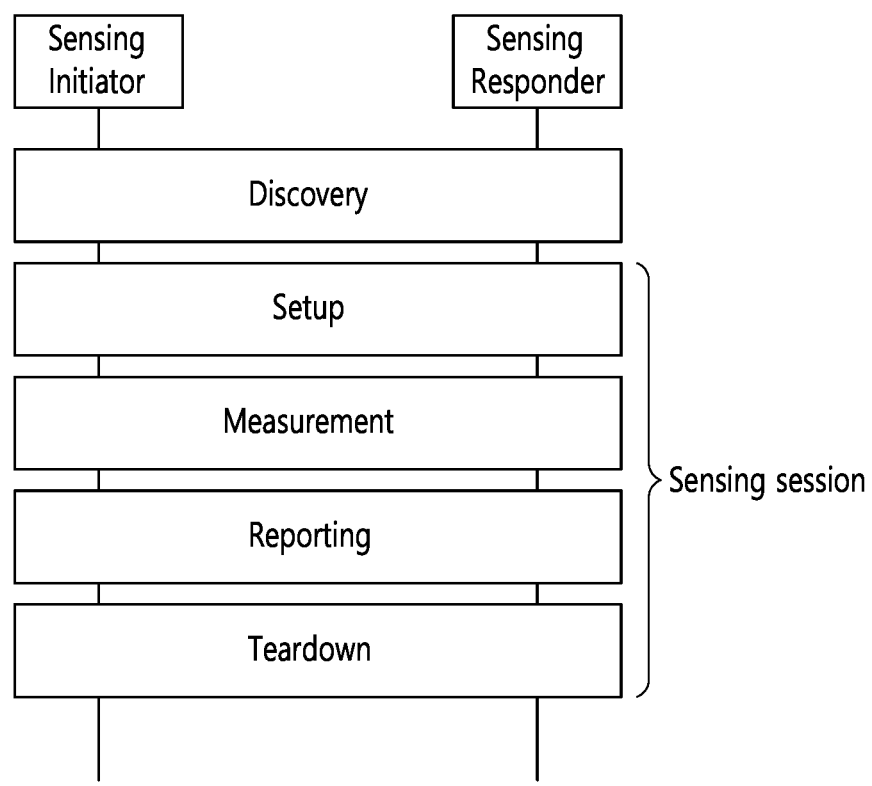
FIG. 4 illustrates an example of a WLAN sensing procedure.

FIG. 4 illustrates an example of a WLAN sensing procedure.

A procedure of WLAN sensing is performed as discovery, negotiation, measurement exchange, tear down, or the like between WLAN sensing initiation apparatus and participating apparatuses. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 5:
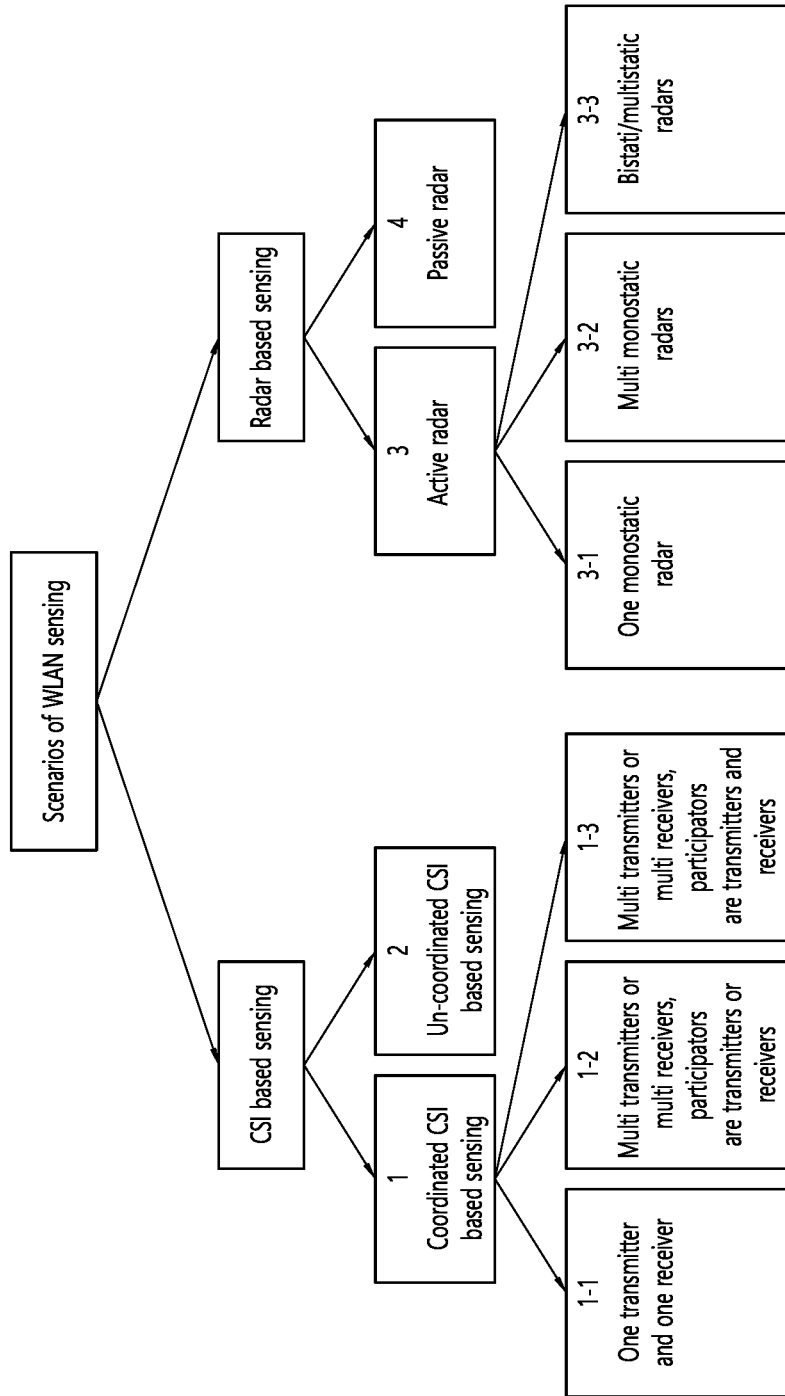
FIG. 5 is an example of classifying WLAN sensing.

FIG. 5 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
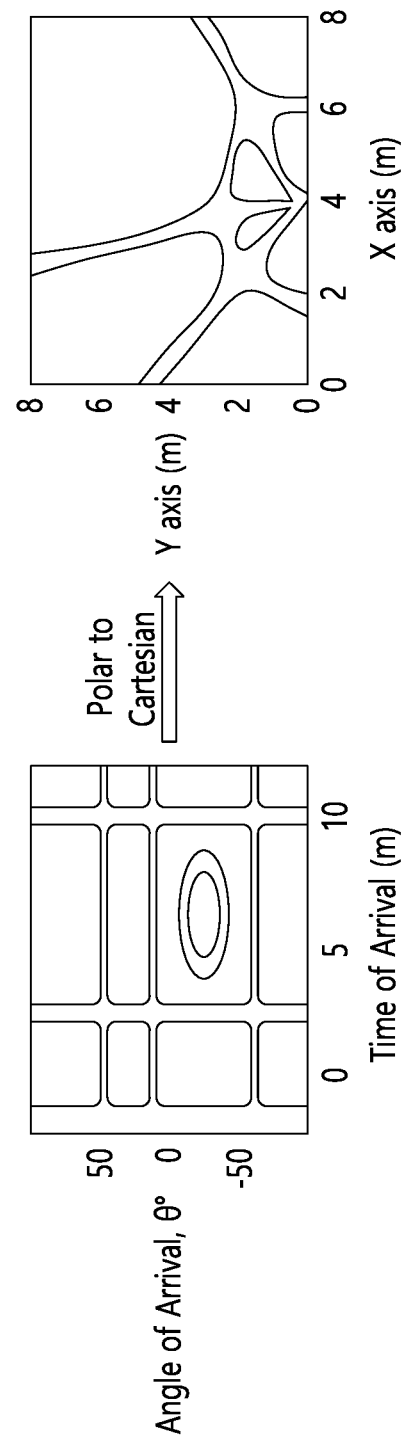
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
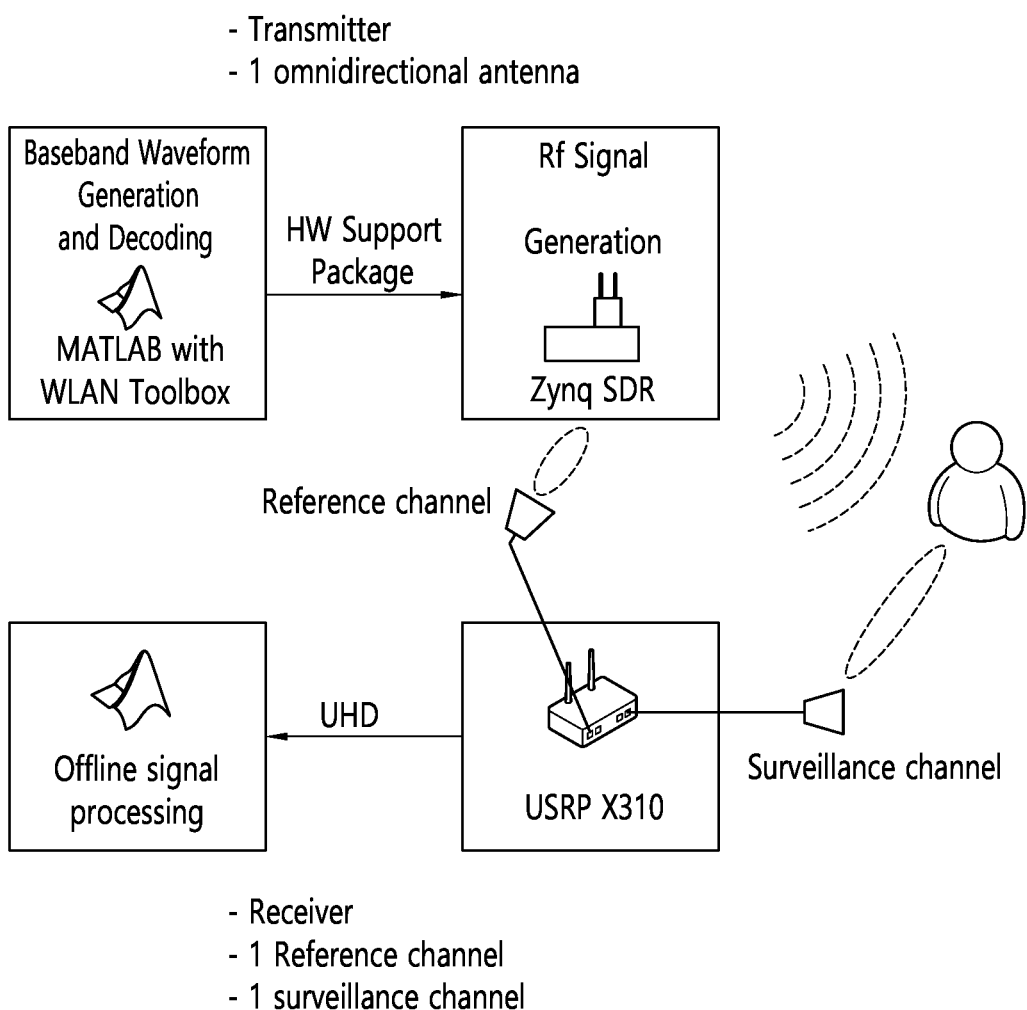
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of | 10 | | | | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Home security | Human) Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/ Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - | detection of | 5 | Presence of | 0.1 | 1/0.1 | 3 |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| detection | humans in car | | Human in car | | | |
| In car sensing | Driver sleepiness detection/ detection aid | 3 | Fast detection of driver sleepiness | 0.01 | 1/0.1 | 3 |

Figure 8:
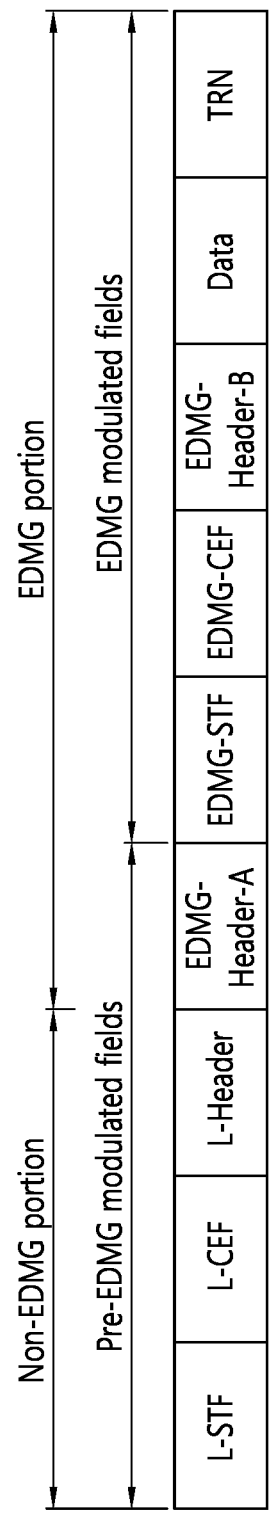
FIG. 8 briefly illustrates a PPDU structure supported in an 802.11ay WLAN system.

In IEEE 802.11, there is ongoing discussion on a technology for sensing a motion or gesture of an object (person or thing) using a Wi-Fi signal of 60 GHz (e.g., 802.11ad or 802.11ay signal). The present specification proposes a method of configuring a frame format used for Wi-Fi sensing and a Wi-Fi sensing sequence. FIG. 8 briefly illustrates a PPDU structure supported in an 802.11ay WLAN system.

As shown in FIG. 8, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index ism of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams $i_{STS}$. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Figure 9:
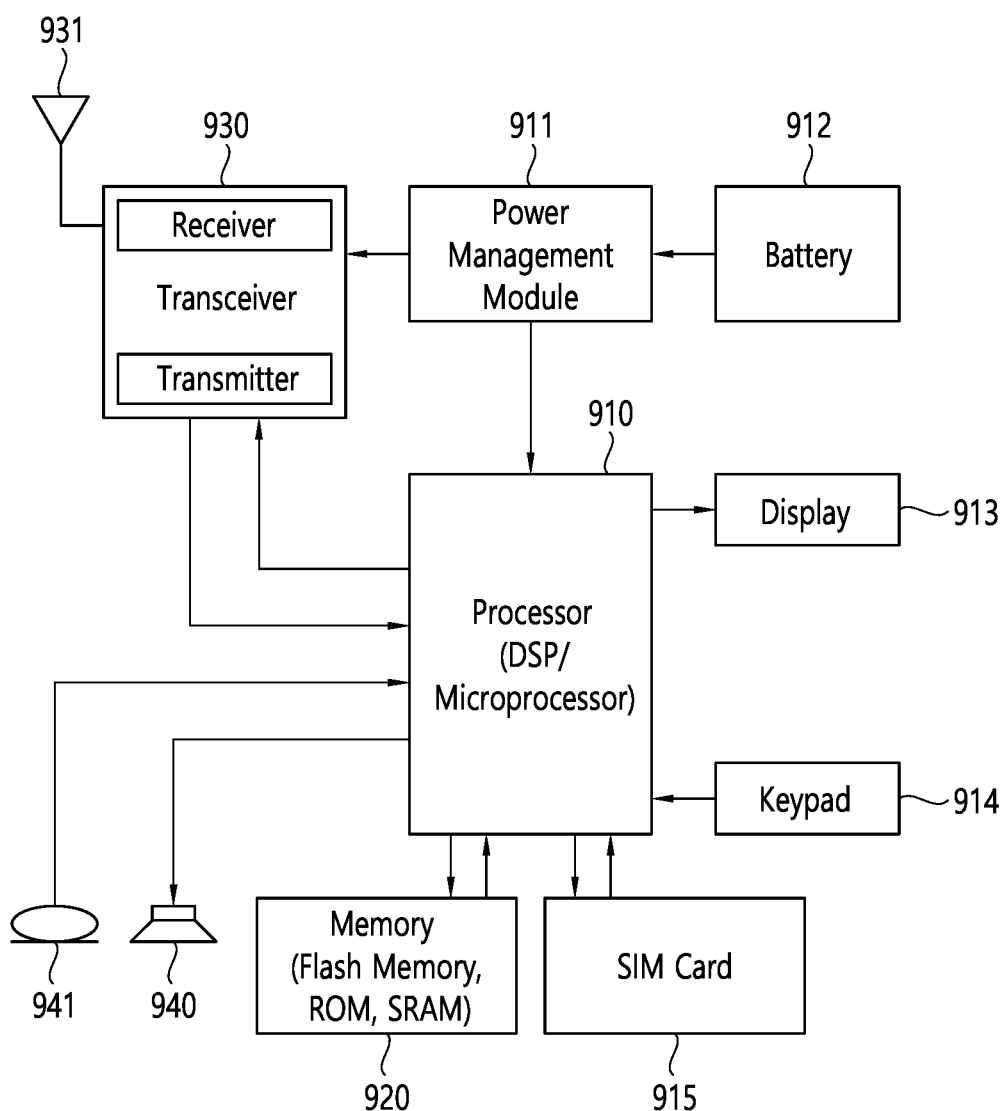
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In 11SENS, an 802.11ad and 802.11ay signal transmitting/receiving method which is a 60 GHz Wi-Fi technology is considered to sense a motion or gesture of an STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

An STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN (e.g., Wi-Fi) transmission is achieved in a broadband by using channel aggregation, channel bonding, or the like. In addition, there is ongoing discussion on WLAN transmission in a more extended broadband.

Recently, with a growing interest in a WLAN device which performs sensing by using a WLAN signal, there is ongoing discussion on this in IEEE 802.11 by organizing a study group. WLAN sensing may include various scenarios.

Figure 10:
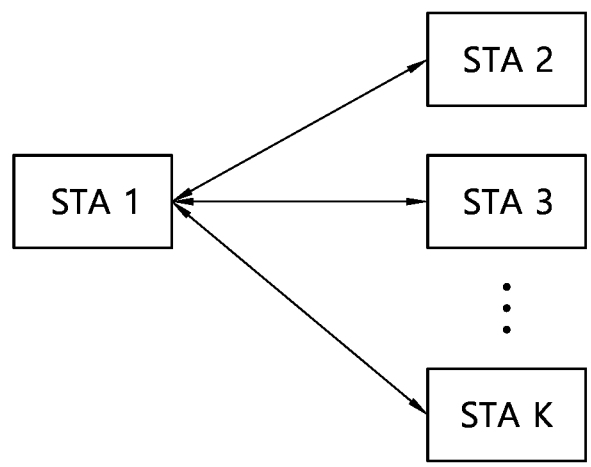
FIG. 10 illustrates an embodiment of WLAN sensing.

FIG. 10 illustrates an embodiment of WLAN sensing.

Referring to FIG. 10, a target to be sensed may be present, and STAs for performing sensing may be present. For example, an AP and an STA may perform sensing. The target may be present between the AP and the STA. For example, the AP may transmit a sensing signal to the STA, and the STA may transmit a feedback signal for the sensing signal to the AP. That is, the AP may transmit a signal to identify a sensing target, and the STA may receive a signal affected from the target and may perform measurement. The STA may transmit a measurement result to the AP, and the AP may identify the target, based on the measurement result.

Figure 11:
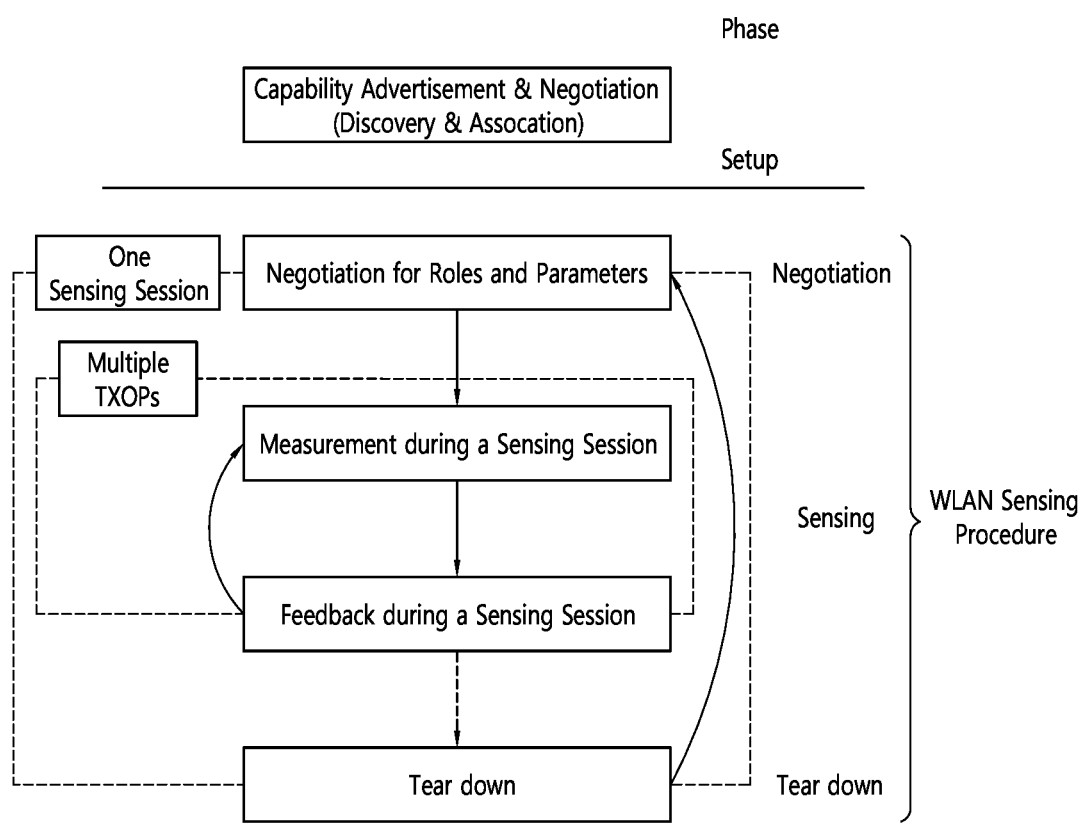
FIG. 11 is a diagram illustrating an overall procedure of WLAN sensing.

FIG. 11 is a diagram illustrating an overall procedure of WLAN sensing.

Referring to FIG. 11, the WLAN sensing may include the following steps.

1) Setup Phase (Capability Advertisement & Negotiation): A step of exchanging capabilities related to sensing and performing an association. In the Setup Phase, STAs can perform the association based on determining whether sensing is possible and whether the STAs have an appropriate sensing capability. That is, in the association step, STAs may exchange information related to whether sensing is possible and a capability related to the sensing.

2) Negotiation Phase (grouping can also be included if necessary): Step for negotiating the role of each STA related to the sensing and parameters to be used during the sensing. The negotiated roles and the negotiated parameters may be used in the sensing session before the negotiated roles and the negotiated parameters being torn down. That is, roles/parameters in the sensing session may be determined in the negotiation phase, and the negotiated roles/parameters may be used before the roles/parameters being torn down. That is, after tearing down, a new role/parameter can be used.

3) Sensing Phase (Measurement during a sensing session & Feedback during a sensing session): Step for transmitting a sensing signal to identify a target and receiving and measuring the signal transmitted through the target. One cycle of this step may be defined as a sensing session.

4) Tear down: In order to reset the negotiated role and parameters, and start the sensing session again, the negotiation process can be performed.

That is, a series of processes from negotiation phase to tear down can be defined as a sensing session. For example, a sensing initiate frame may be transmitted before the sensing signal is transmitted, and transmission of the sensing initiate frame may also be included in the sensing session. That is, transmission of a sensing initiate frame, transmission of a sensing signal, and transmission of a feedback frame may constitute one sensing session.

In the present specification, the Setup phase will be described.

Due to a new frame definition or a new protocol definition, in order to support the new frame definition or the new protocol definition, WLAN sensing requires capability negotiation in the setup phase. That is, sensing devices need to know whether each other's sensing functionality exists or not. The sensing capability negotiation may be performed in the discovery (or scanning) steps and association steps of the existing legacy WLAN.

The WLAN standard that can operate in Sub-7 GHz referred to in the present specification may mean 11a, 11n, 11ac, 11ax, 11be, etc., the WLAN standard capable of operating in a 60 GHz band may mean 11ad, 11ay, and the like. Also, in the present specification, the STA may be an AP or a non-AP STA.

Sensing capability may be defined in the following way, but is not limited thereto.

1. Simple Indication

A capability indicating whether or not to simply support WLAN sensing can be defined. If only WLAN sensing is defined, for other capabilities related to sensing, capabilities defined in the existing Sub-7 GHz or 60 GHz bands can be reused.

For example, if the 1-bit WLAN Sensing enabled field determines whether or not to support WLAN sensing, if the value is 1, WLAN sensing is supported, and if it is 0, WLAN sensing is not supported.

FIG. 12 is a diagram illustrating an embodiment of a simple indication method.

Referring to FIG. 12, a capability related to whether WLAN sensing is supported may be defined. For example, the WLAN sensing enabled field may include information on whether the WLAN sensing is supported or not. This method can significantly reduce overhead by reusing existing capabilities, but the existing capabilities cannot indicate the capability specialized for sensing like the methods described below.

2. WLAN Sensing Specific Indication: Non-Hierarchical Structure

Capabilities can be classified by various elements specialized for WLAN sensing. That is, capabilities that can be distinguished in sensing may exist, and capabilities may be indicated as follows. In addition, capabilities not indicated here are not separately indicated, and may be indicated by an existing IE (e.g., VHT/HE/EHT capabilities), it can also be reused for cases related to the sensing.

A specific example according to this instruction method is as follows.

When Listing without Classification According to Specific Capabilities

FIG. 13 is a diagram illustrating an embodiment of sensing capability.

Referring to FIG. 13, Sensing capability may include all capabilities related to WLAN sensing. For example, WLAN sensing capability may include the following information.

A. Per band: Whether to support sensing per band. That is, information on whether the sensing is supported for each frequency band may be included. For example, 4-bit information related to whether 2.4 GHz, 5 GHz, 6 GHz, and 60 GHz is supported may be included.

B. Per channel measurement (CM) method: Whether to support channel measurement method during signal sensing. That is, bits related to several channel measurement methods may be included, and whether each channel measurement method is supported may be indicated based on the corresponding bit. For example, information related to whether a channel state information (CSI)-based channel measurement method is supported may be included.

C. Per sensing-capable bandwidth: The bandwidth available for sensing. That is, as information related to a bandwidth in which sensing can be performed, information on whether sensing can be performed for each bandwidth, not the maximum bandwidth in which sensing can be performed, may be included. For example, 5-bit information related to whether sensing can be performed in bandwidths of 20 MHz, 40 MHz, 80 MHz, 160 MHz, and 320 MHz may be included.

D. WLAN Sensing roles: Whether what roles can be supported. Information on which role the corresponding STA can perform in sensing may be included. Examples of role types in sensing are as follows, but are not limited thereto.

Sensing initiator: an STA initiating a WLAN sensing session.

Sensing responder: an STA participating in the WLAN sensing session initiated by the sensing initiator.

Sensing transmitter: an STA that transmits a PPDU for sensing measurement in a sensing session.

Sensing receiver: an STA that receives the PPDU transmitted by the sensing transmitter and performs sensing measurement.

When Listing New WLAN Sensing Capability with Classification

Figure 14:
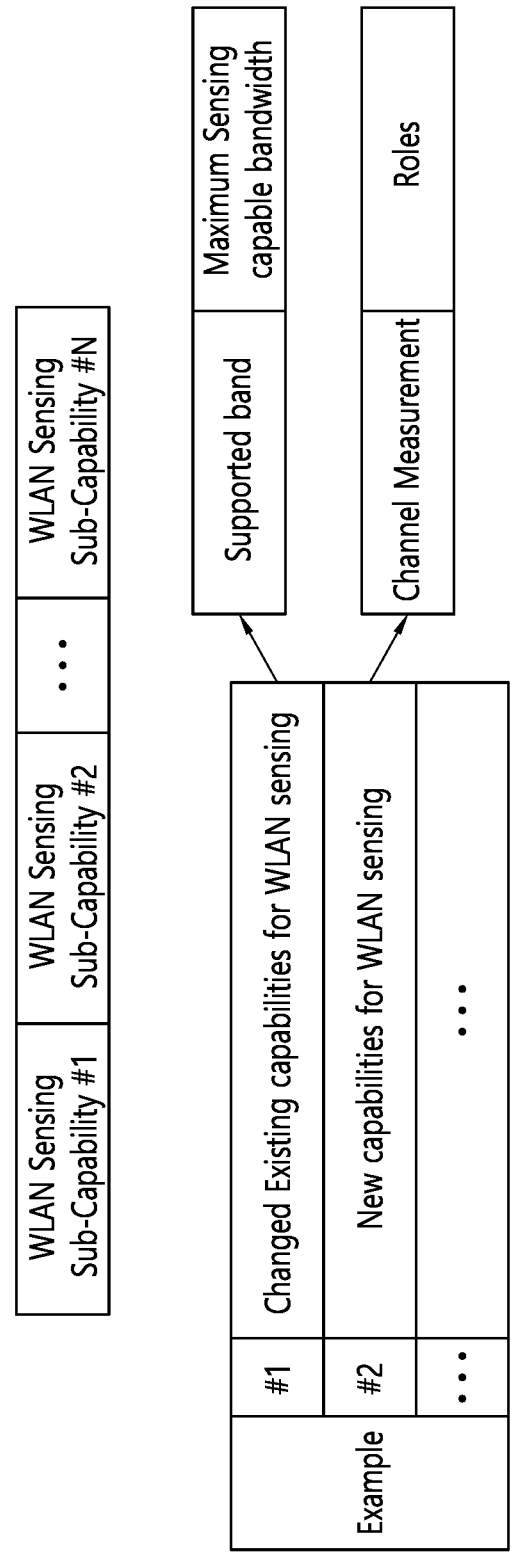

FIG. 14 is a diagram illustrating an embodiment of sensing capability.

Referring to FIG. 14, the sensing capability may include the existing capability and the new WLAN sensing capability separately. When changing the capabilities indicated in the existing capabilities IE for the WLAN sensing, there may be capabilities that must be newly indicated in WLAN sensing. Therefore, they can be indicated separately (i.e., with classification).

That is, the sensing capability may include Changed Existing capabilities for WLAN sensing field including existing capabilities such as supported band, and maximum sensing-capable bandwidth, etc., and may include a New capabilities for WLAN sensing field including new capabilities for the WLAN sensing such as Channel Measurement and Roles, etc.

When Listing with Classification According to Specific Capabilities

FIG. 15 is a diagram illustrating an embodiment of sensing capability.

Referring to FIG. 15, sensing capabilities may be classified and listed based on the specific capabilities.

For example, the sensing capability may include separate capability information based on a band. That is, different capabilities may be configured based on Sub-7 GHz and 60 GHz. That is, the capability information for sensing performed in the sub-7 GHz band and the capability information for sensing performed in the 60 GHz band may be distinguished.

Figure 16:
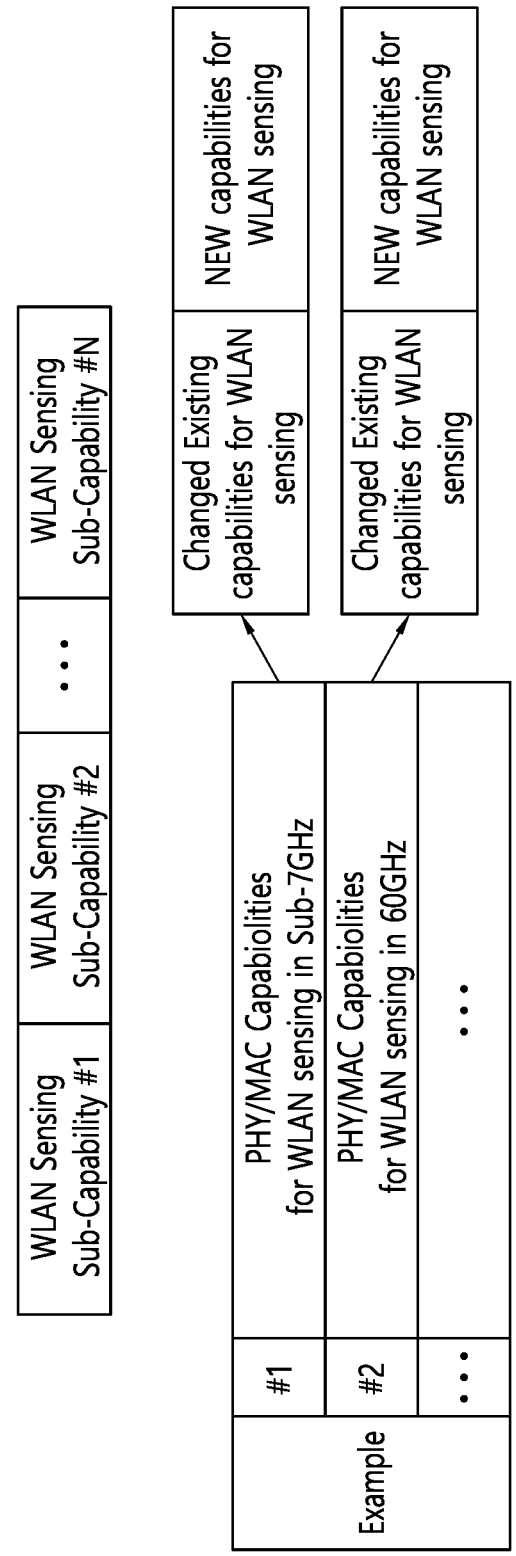

FIG. 16 is a diagram illustrating an embodiment of sensing capability.

Referring to FIG. 16, the sensing capability may be classified and listed according to specific capabilities, and the existing capability and the New WLAN sensing capability may be included separately. That is, the capabilities may be configured in combination with the example in FIG. 13. For example, the sensing capability may include a capability information field for sensing performed in a sub-7 GHz band and a capability information field for sensing performed in a 60 GHz band. Each capability information field may include a Changed Existing capabilities for a WLAN sensing field including an existing capability and a New capabilities for the WLAN sensing field including a new capability.

The capability according to the "2. WLAN sensing specific indication: Non-hierarchical Structure" method always exists regardless of whether all fields according to the specific capability exist. Therefore, sometimes a fairly large signaling overhead may occur. For example, information on WLAN sensing capabilities for 60 GHz may be included even though 60 GHz for the WLAN sensing is not supported.

3. WLAN Sensing Specific Indication: Hierarchical Structure

The WLAN sensing may indicate different capabilities by specific capability. As a representative example, the supported technologies (for example, 11ax and 11ay) may vary depending on the band supported by the WLAN. The WLAN sensing capability may be indicated hierarchically. The WLAN sensing capability may include a common part and an individual part.

Common part: A part that includes the capability that can be shared in common regardless of the specific capability for WLAN sensing or whether it indicates whether a specific capability is indicated.

Individual Part: A part that indicates specific capabilities according to the value indicated in the common part.

Figure 17:
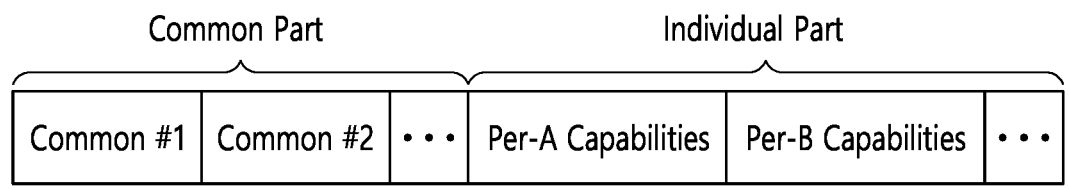

FIG. 17 is a diagram illustrating an embodiment of sensing capability.

Referring to FIG. 17, the sensing capability may include a common part and an individual part. For example, the common part may include information related to capabilities commonly applied to the sensing in a sub-7 GHz band and the sensing in a 60 GHz band.

Figure 18:
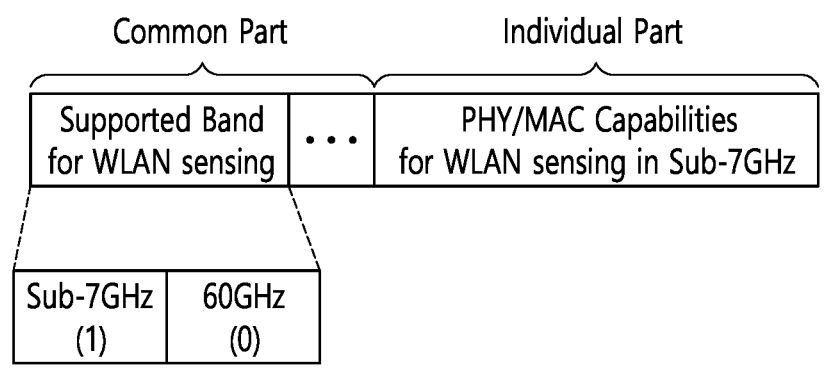

FIG. 18 is a diagram illustrating an embodiment of sensing capability.

Referring to FIG. 18, the common part may include information related to a band supported for WLAN sensing. That is, the common part of the sensing capability may include information related to whether or not to indicate a specific capability. Depending on the supported band, the capabilities of subsequent individual parts may vary. For example, if the common part supports only Sub-7 GHz, the individual part can include only the capabilities for Sub-7 GHz. For example, the common part may include information related to whether or not to support WLAN sensing performed in a sub-7 GHz band and information related to whether or not to support WLAN sensing performed in a 60 GHz band. If the STA supports WLAN sensing performed in the sub-7 GHz band based on the common part, the individual part includes capability information for sub-7 GHz band sensing, if the STA supports WLAN sensing performed in the 60 GHz band is supported, the individual part may include capability information for WLAN sensing performed in the 60 GHz band.

Figure 19:
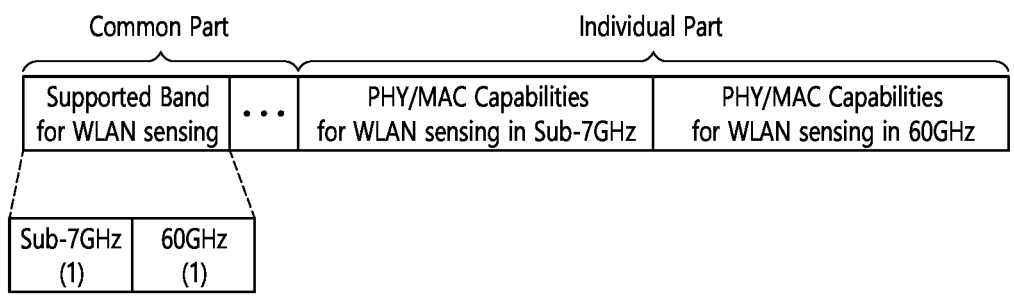

FIG. 19 is a diagram illustrating an embodiment of sensing capability.

Referring to FIG. 19, the common part may include information that both sub-7 GHz and 60 GHz bands support WLAN sensing, the individual part may include capabilities for WLAN sensing performed in Sub-7 GHz and 60 GHz bands.

Hereinafter, embodiments for individual parts are described. The PHY/MAC capabilities of FIG. 19 may be listed without specific classification as shown in FIG. 13, but may be classified as New WLAN sensing capabilities as shown in FIG. 16.

Figure 20:
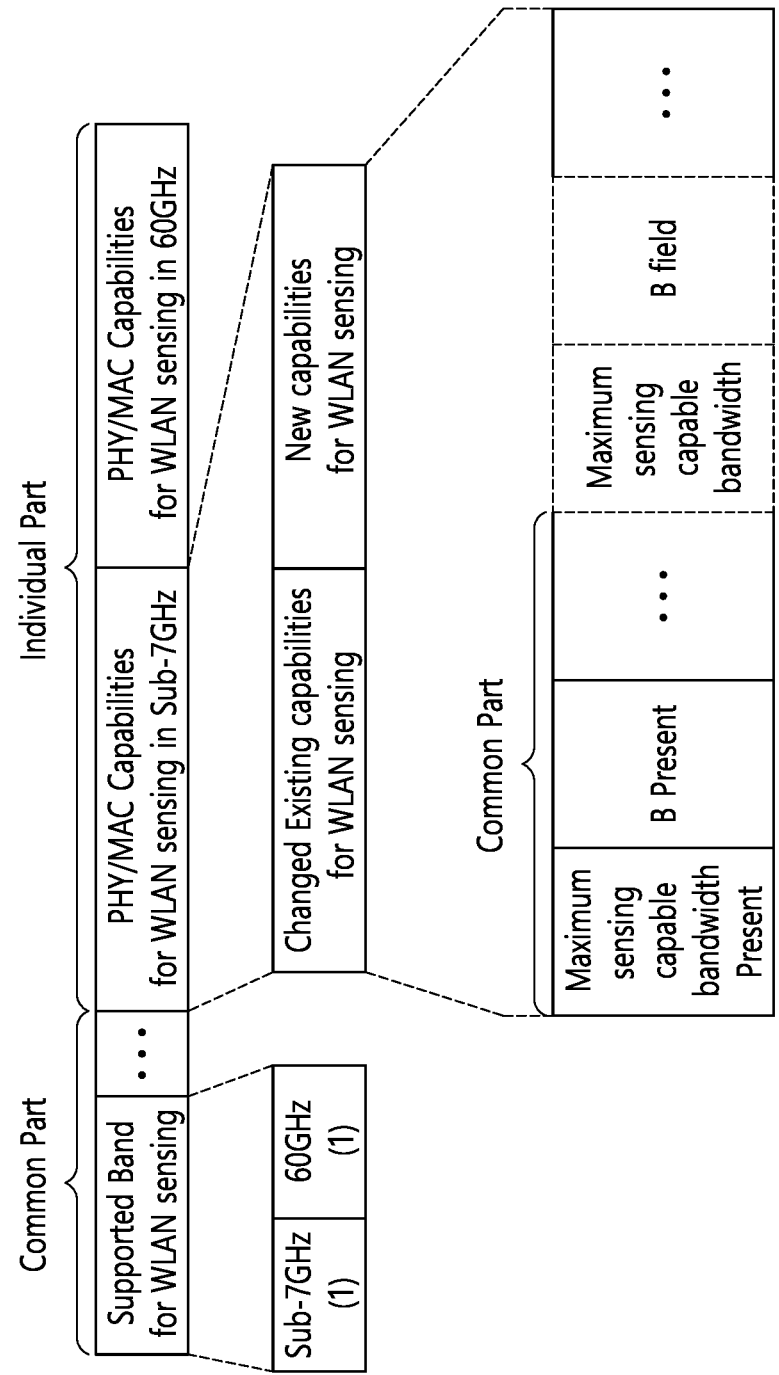

FIG. 20 is a diagram illustrating an embodiment of sensing capability.

Referring to FIG. 20, the sensing capability may include a common part and an individual part. When changing existing capabilities, fields for the changed capabilities may always be included, but some capabilities may not be changed. Therefore, in order to reduce overhead, the transmitting STA may indicate whether a corresponding capability field exists, such as a control part based on the Present field, the receiving STA may check whether the changed capability field exists. For example, if the Maximum sensing-capable bandwidth present value is 1, the Maximum sensing-capable bandwidth field may exist, if the B Present value is 0, the B field may not exist.

An embodiment of the present disclosure is applied only to Changed Existing capabilities, but this can be applied to new capabilities, the common part described above, the changed existing capabilities, and the entire individual part, not each of the new capabilities. That is, present field may exist in all areas of sensing capability, based on the present field, whether a field related to the corresponding capability exists may be determined.

FIG. 21 is a diagram illustrating an embodiment of sensing capability.

Referring to FIG. 21, the sensing capability may include a common part and an individual part. The common part may include a capability that may be commonly possessed regardless of a specific capability (i.e., a sensing band). For example, the common part may include information related to common PHY/MAC capabilities regardless of the band, the individual part may include information related to capabilities specific to each of the Sub-7 GHz and 60 GHz bands. For example, if a common capability or a specific capability corresponding to sub-7 GHz or 60 GHz does not exist, the corresponding field may not exist.

Figure 22:
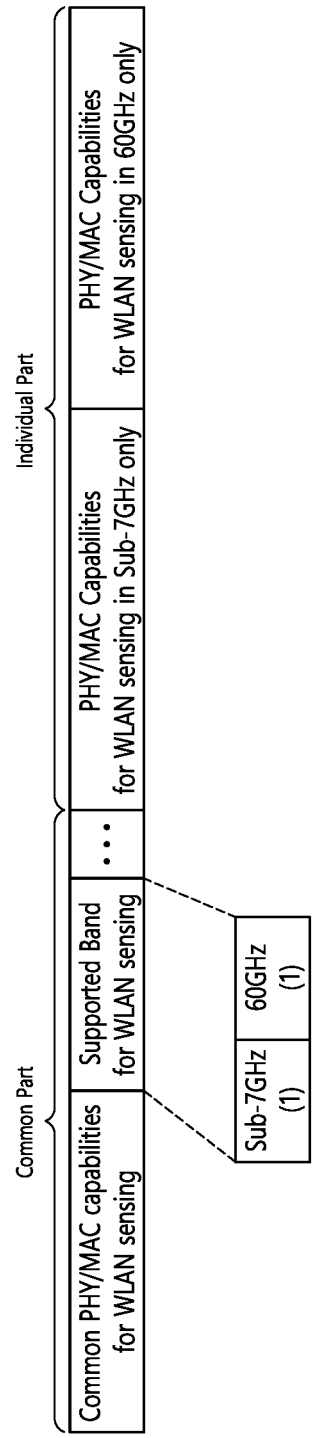

FIG. 22 is a diagram illustrating an embodiment of sensing capability.

Refer to FIG. 22, sensing capability may include a common part and an individual part. The common part may include a capability that the common part may have in common regardless of a specific capability (i.e., a sensing band). Also, the common part may include information related to a band supported for the WLAN sensing. For example, the common part may include information related to whether or not to support the WLAN sensing performed in a sub-7 GHz band and information related to whether or not to support the WLAN sensing performed in a 60 GHz band.

If the STA supports WLAN sensing performed in the sub-7 GHz band based on the common part, the individual part includes capability information for sub-7 GHz band sensing, if the STA supports WLAN sensing performed in the 60 GHz band is supported, the individual part may include capability information for WLAN sensing performed in the 60 GHz band.

The common part includes information related to common PHY/MAC capabilities regardless of band, depending on the supported band, the capabilities below it may vary. If the supported band supports both Sub-7 GHz and 60 GHz, the individual part may include information related to specific capabilities for Sub-7 GHz and 60 GHz.

4. In Case of Amendment to the Existing Spec

Methods 1 to 3 above are methods of adding a separate IE for WLAN sensing, for the WLAN sensing, each existing capabilities IE (e.g., VHT/HE capabilities element) may include the capability information described above. For example, the capabilities for the WLAN sensing may be included in the existing capabilities IE. In this method, it is not necessary to create a new IE, but by modifying the existing capabilities IE, it may cause a malfunction to the legacy STA, and all existing standards should be modified.

Figure 23:
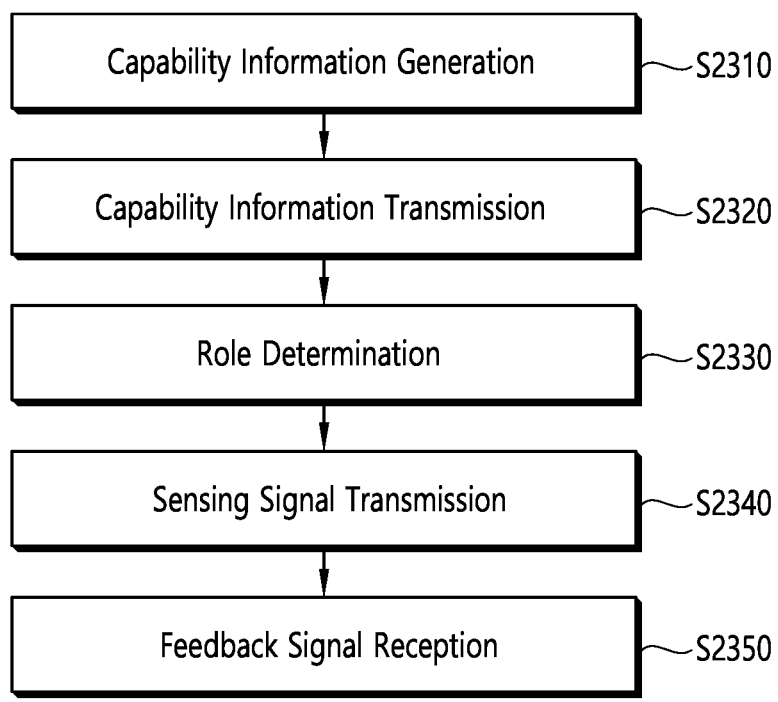
FIG. 23 is a diagram illustrating an embodiment of an operating method of a transmitting STA.

FIG. 23 is a diagram illustrating an embodiment of an operating method of a transmitting STA.

Referring to FIG. 23, an operation of a transmitting STA may be based on technical features described in at least one of FIGS. 1 to 22.

The transmitting STA may generate capability information (S2310). For example, the transmitting STA may generate capability information related to WLAN sensing. For example, the capability information may include a common part and an individual part. For example, the common part may include sensing support band information including information related to whether or not to support WLAN sensing performed in a sub 7 GHz band and information related to whether or not to support WLAN sensing performed in a 60 GHz band. For example, the individual part may include at least one of capability information for the WLAN sensing performed in the sub 7 GHz band based on the sensing support band information, and capability information for the WLAN sensing performed in the 60 GHz band.

Sensing capability may include a common part and an individual part. The common part may include a capability that the common part may have in common regardless of a specific capability (i.e., a sensing band). Also, the common part may include information related to a band supported for the WLAN sensing. For example, the common part may include information related to whether or not to support the WLAN sensing performed in a sub-7 GHz band and information related to whether or not to support the WLAN sensing performed in a 60 GHz band.

If the STA supports WLAN sensing performed in the sub-7 GHz band based on the common part, the individual part includes capability information for sub-7 GHz band sensing, if the STA supports WLAN sensing performed in the 60 GHz band is supported, the individual part may include capability information for WLAN sensing performed in the 60 GHz band.

For example, the common part may further include common capability information commonly applied to the WLAN sensing performed in the sub 7 GHz and 60 GHz bands.

For example, the common capability information may further include information related to a bandwidth on which the sensing can be performed.

For example, the individual part may include at least one of whether a channel measurement method used for the WLAN sensing is supported and whether a role in the WLAN sensing is supported.

For example, the role may include at least one of a sensing initiator, a sensing responder, a sensing transmitter, and a sensing receiver.

Examples of types for role in sensing are as follows, but are not limited thereto.

Sensing initiator: an STA initiating a WLAN sensing session.

Sensing responder: an STA participating in the WLAN sensing session initiated by the sensing initiator.

Sensing transmitter: an STA that transmits a PPDU for sensing measurement in a sensing session.

Sensing receiver: an STA that receives the PPDU transmitted by the sensing transmitter and performs sensing measurement.

The transmitting STA may transmit capability information (S2320). For example, the transmitting STA may transmit the capability information to the receiving STA.

The transmitting STA may determine a role (S2330). For example, the transmitting STA may determine roles to be performed by the transmitting STA and the receiving STA in the WLAN sensing. For example, roles in the WLAN sensing of the transmitting STA and the receiving STA may be determined.

The transmitting STA may transmit a sensing signal (S2340). For example, the transmitting STA may transmit a sensing signal to the receiving STA.

The transmitting STA may receive the feedback signal (S2350). For example, the transmitting STA may receive a feedback signal for the sensing signal from the receiving STA.

Figure 24:
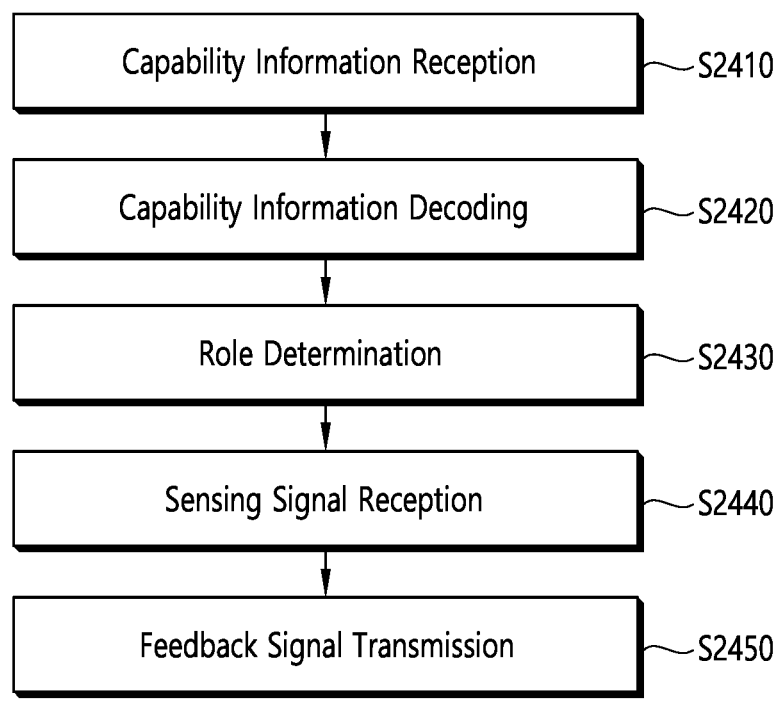
FIG. 24 is a diagram illustrating an embodiment of an operating method of a receiving STA.

FIG. 24 is a diagram illustrating an embodiment of an operating method of a receiving STA.

Referring to FIG. 24, an operation of a receiving STA may be based on technical features described in at least one of FIGS. 1 to 22.

The receiving STA may receive capability information (S2410). For example, the receiving STA may receive the capability information related to WLAN sensing from the transmitting STA. For example, the capability information may include a common part and an individual part. For example, the common part may include sensing support band information including information related to whether or not to support WLAN sensing performed in a sub 7 GHz band and information related to whether or not to support WLAN sensing performed in a 60 GHz band. For example, the individual part may include at least one of capability information for the WLAN sensing performed in the sub 7 GHz band based on the sensing support band information, and capability information for the WLAN sensing performed in the 60 GHz band.

Sensing capability may include a common part and an individual part. The common part may include a capability that the common part may have in common regardless of a specific capability (i.e., a sensing band). Also, the common part may include information related to a band supported for the WLAN sensing. For example, the common part may include information related to whether or not to support the WLAN sensing performed in a sub-7 GHz band and information related to whether or not to support the WLAN sensing performed in a 60 GHz band.

If the STA supports WLAN sensing performed in the sub-7 GHz band based on the common part, the individual part includes capability information for sub-7 GHz band sensing, if the STA supports WLAN sensing performed in the 60 GHz band is supported, the individual part may include capability information for WLAN sensing performed in the 60 GHz band.

For example, the common part may further include common capability information commonly applied to the WLAN sensing performed in the sub 7 GHz and 60 GHz bands.

For example, the common capability information may further include information related to a bandwidth on which the sensing can be performed.

For example, the individual part may include at least one of whether a channel measurement method used for the WLAN sensing is supported and whether a role in the WLAN sensing is supported.

For example, the role may include at least one of a sensing initiator, a sensing responder, a sensing transmitter, and a sensing receiver.

Examples of types for role in sensing are as follows, but are not limited thereto.

Sensing initiator: an STA initiating a WLAN sensing session.

Sensing responder: an STA participating in the WLAN sensing session initiated by the sensing initiator.

Sensing transmitter: an STA that transmits a PPDU for sensing measurement in a sensing session.

Sensing receiver: an STA that receives the PPDU transmitted by the sensing transmitter and performs sensing measurement.

The receiving STA may decode the capability information (S2420). For example, the receiving STA may decode the capability information.

The receiving STA may determine a role (S2430). For example, the receiving STA may determine roles to be performed by the transmitting STA and the receiving STA in WLAN sensing. For example, the roles in WLAN sensing of the transmitting STA and the receiving STA may be determined.

The receiving STA may receive a sensing signal (S2440). For example, the receiving STA may receive the sensing signal from the transmitting STA.

The receiving STA may transmit a feedback signal (S2450). For example, the receiving STA may transmit a feedback signal for the sensing signal to the transmitting STA.

Some of the detailed steps shown in the example of FIGS. 23 and 24 may not be essential steps and may be omitted. In addition to the steps shown in FIGS. 23 and 24, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIG. 1 and/or FIG. 9. For example, the technical features of the present specification described above may be applied only to a part of FIGS. 1 and/or 9. For example, the technical features of the present specification described above may be implemented based on the processing chips 114 and 124 of FIG. 1, or may be implemented based on the processor 111, 121 and the memory 112, 122 of FIG. 1, or may be implemented based on the processor 910 and the memory 920 of FIG. 9. For example, in the apparatus of the present specification, the apparatus may include: a memory; and a processor operatively coupled with the memory, the processor may be adapted to generate capability information related to WLAN sensing, the capability information may include a common part and an individual part, the common part may include sensing support band information including information related to whether or not to support WLAN sensing performed in a sub 7 GHz band and information related to whether or not to support WLAN sensing performed in a 60 GHz band, the individual part may include at least one of capability information for WLAN sensing performed in the sub 7 GHz band and capability information for WLAN sensing performed in the 60 GHz band based on the sensing support band information; and the processor may be adapted to transmit the capability information to the receiving STA.

The technical features of the present specification may be implemented based on a CRM (computer readable medium). For example, the CRM proposed by the present specification, which is at least one computer-readable recording medium (computer readable medium) including instructions based on being executed by at least one processor of a transmitting STA (station) of a wireless local area network (Wireless Local Area Network) system. Based on that the instructions being executed by the at least one processor of the transmitting STA of the WLAN, the operations includes: generating capability information related to the WLAN sensing, the capability information may include a common part and an individual part, the common part may include sensing support band information including information related to whether or not to support the WLAN sensing performed in a sub 7 GHz band and information related to whether or not to support the WLAN sensing performed in a 60 GHz band, the individual part may include at least one of capability information for the WLAN sensing performed in the sub 7 GHz band and capability information for the WLAN sensing performed in the 60 GHz band based on the sensing support band information; and the transmitting the capability information to a receiving STA.

The instructions stored in the CRM of the present specification may be executed by at least one processor. At least one processor related to CRM in the present specification may be the processors 111 and 121 or the processing chips 114 and 124 of FIG. 1, or the processor 910 of FIG. 9. Meanwhile, the CRM of the present specification may be the memories 112 and 122 of FIG. 1, the memory 920 of FIG. 9, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting station (STA) of a wireless local area network (WLAN) system, the method comprising:
   generating capability information related to WLAN sensing,
   wherein the capability information includes a common part and an individual part,
   wherein the common part includes sensing support band information including information related to whether or not to support the WLAN sensing performed in a sub 7 GHz band and information related to whether or not to support the WLAN sensing performed in a 60 GHz band,
   wherein the individual part includes at least one of capability information for the WLAN sensing performed in the sub 7 GHz band and capability information for the WLAN sensing performed in the 60 GHz band, based on the sensing support band information; and
   transmitting the capability information to a receiving STA.

2. The method of claim 1,
   wherein the common part further includes common capability information commonly applied to the WLAN sensing performed in the sub 7 GHz band and the WLAN sensing performed in the 60 GHz band.

3. The method of claim 2,
   wherein the common capability information further includes information related to a bandwidth on which sensing can be performed.

4. The method of claim 1,
   wherein the individual parts include at least one of whether the channel measurement method used for the WLAN sensing is supported and whether a role in WLAN sensing is supported.

5. The method of claim 4,
   wherein the role includes at least one of a sensing initiator, a sensing responder, a sensing transmitter, or a sensing receiver.

6. The method of claim 1, further comprising:
   determining roles of the transmitting STA and the receiving STA in the WLAN sensing.

7. The method of claim 1, further comprising:
   transmitting a sensing signal to the receiving STA; and
   receiving a feedback signal for the sensing signal from the receiving STA.

8. A transmitting station (STA) of a wireless local area network (WLAN) system, the transmitting STA comprising:
   a transceiver for transmitting and receiving a radio signal; and
   a processor coupled to the transceiver, the processor is adapted to perform operations comprising:
   generating capability information related to WLAN sensing,
   wherein the capability information includes a common part and an individual part,
   wherein the common part includes sensing support band information including information related to whether or not to support the WLAN sensing performed in a sub 7 GHz band and information related to whether or not to support the WLAN sensing performed in a 60 GHz band,
   wherein the individual part includes at least one of capability information for the WLAN sensing performed in the sub 7 GHz band and capability information for the WLAN sensing performed in the 60 GHz band, based on the sensing support band information; and
   transmitting the capability information to a receiving STA.

9. The transmitting STA of claim 8,
   wherein the common part further includes common capability information commonly applied to the WLAN sensing performed in the sub 7 GHz band and the WLAN sensing performed in the 60 GHz band.

10. The transmitting STA of claim 9,
    wherein the common capability information further includes information related to a bandwidth on which sensing can be performed.

11. The transmitting STA of claim 8,
    wherein the individual parts include at least one of whether the channel measurement method used for the WLAN sensing is supported and whether a role in WLAN sensing is supported.

12. The transmitting STA of claim 11,
    wherein the role includes at least one of a sensing initiator, a sensing responder, a sensing transmitter, or a sensing receiver.

13. The transmitting STA of claim 8,
    wherein the processor is further adapted to perform:
    determining roles of the transmitting STA and the receiving STA in the WLAN sensing.

14. The transmitting STA of claim 8,
    wherein the processor is further adapted to perform:
    transmitting a sensing signal to the receiving STA; and
    receiving a feedback signal for the sensing signal from the receiving STA.

15. A receiving station (STA) of a wireless local area network (WLAN) system, the receiving STA comprising:
    a transceiver for transmitting and receiving a radio signal; and
    a processor coupled to the transceiver, the processor is adapted to perform operations comprising:
    receiving capability information related to WLAN sensing from a transmitting STA,
    wherein the capability information includes a common part and an individual part,
    wherein the common part includes sensing support band information including information related to whether or not to support the WLAN sensing performed in a sub 7 GHz band and information related to whether or not to support the WLAN sensing performed in a 60 GHz band,
    wherein the individual part includes at least one of capability information for the WLAN sensing performed in the sub 7 GHz band and capability information for the WLAN sensing performed in the 60 GHz band, based on the sensing support band information; and
    decoding the capability information.

* * * * *